(12) United States Patent
Lu et al.

(10) Patent No.: US 10,643,610 B2
(45) Date of Patent: May 5, 2020

(54) VOICE INTERACTION BASED METHOD AND APPARATUS FOR GENERATING MULTIMEDIA PLAYLIST

(71) Applicant: BAIDU ONLINE NETWORK TECHNOLOGY (BEIJING) CO., LTD., Beijing (CN)

(72) Inventors: Guang Lu, Beijing (CN); Shui Liu, Beijing (CN); Xiajun Luo, Beijing (CN); Shiquan Ye, Beijing (CN); Xiangjie Yin, Beijing (CN); Qiang Ju, Beijing (CN); Jian Xie, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 131 days.

(21) Appl. No.: 15/858,885

(22) Filed: Dec. 29, 2017

(65) Prior Publication Data

US 2019/0147864 A1  May 16, 2019

(30) Foreign Application Priority Data

Nov. 15, 2017  (CN) .......................... 2017 1 1129965

(51) Int. Cl.
| | | |
|---|---|---|
| G10L 15/22 | (2006.01) |
| G06F 16/48 | (2019.01) |
| G10L 15/02 | (2006.01) |
| G10L 25/54 | (2013.01) |
| G10L 15/18 | (2013.01) |
| G06F 16/438 | (2019.01) |
| G10L 15/08 | (2006.01) |

(52) U.S. Cl.
CPC .......... *G10L 15/22* (2013.01); *G06F 16/4393* (2019.01); *G06F 16/48* (2019.01); *G10L 15/02* (2013.01); *G10L 15/1815* (2013.01); *G10L 25/54* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 9,558,740 B1 * | 1/2017 | Mairesse | G10L 15/08 |
| 9,578,374 B1 * | 2/2017 | Whitten | G06F 16/40 |
| 10,049,663 B2 * | 8/2018 | Orr | G10L 25/84 |
| 10,271,093 B1 * | 4/2019 | Jobanputra | G06F 16/3329 |
| 2003/0093790 A1 * | 5/2003 | Logan | G10H 1/0033 725/38 |
| 2007/0214182 A1 * | 9/2007 | Rosenberg | G06Q 30/06 |

(Continued)

*Primary Examiner* — Seong-Ah A Shin
(74) *Attorney, Agent, or Firm* — Lathrop GPM LLP

(57) ABSTRACT

Embodiments of this disclosure disclose a voice interaction based method and apparatus for generating a multimedia playlist. An embodiment of the method comprises: acquiring first voice request information for playing multimedia resources; identifying a key tag for indicating a characteristic attribute of the multimedia resources in the first voice request information; finding the multimedia resources having the key tag in a multimedia resource library; and generating a multimedia playlist based on the found multimedia resources. The embodiment realizes automatic generation of multimedia playlists and improves the efficiency of voice service.

15 Claims, 5 Drawing Sheets

(56) References Cited

U.S. PATENT DOCUMENTS

| | | | | |
|---|---|---|---|---|
| 2012/0110126 A1* | 5/2012 | Sparks | ............... | H04L 67/06 |
| | | | | 709/219 |
| 2012/0303713 A1* | 11/2012 | Harbick | ............ | G06Q 30/02 |
| | | | | 709/204 |
| 2016/0327399 A1* | 11/2016 | Ronnang | ............ | G01C 21/26 |
| 2017/0116990 A1* | 4/2017 | Faaborg | ............ | G06F 3/167 |

* cited by examiner

VOICE INTERACTION BASED METHOD AND APPARATUS FOR GENERATING MULTIMEDIA PLAYLIST

CROSS-REFERENCE TO RELATED APPLICATIONS

This application is related to and claims priority from Chinese Patent Application No. 201711129965.0, filed with the State Intellectual Property Office (SIPO) of the People's Republic of China on Nov. 15, 2017, the entire disclosure of the Chinese application is hereby incorporated by reference.

TECHNICAL FIELD

This disclosure relates to the field of computer technology, specifically to the field of artificial intelligence technology, and more specifically to a voice interaction based method and apparatus for generating a multimedia playlist.

BACKGROUND

With the development of computer technology and the unceasing accumulation of network data, artificial intelligence technology has developed very rapidly. In the field of artificial intelligence, the intelligent voice service integrating voice recognition, natural language processing and machine learning technology is increasingly more widely used.

On a traditional multimedia resource playing platform, a user may implement an interactive operation of editing a playlist to customize the playlist. An existing voice interaction based multimedia resource playing system may support a user to play on-demand multimedia resource under a single condition in a voice interaction. A background server for intelligent voice service will find the multimedia resource requested by the user, and play the multimedia resource through an intelligent voice device.

SUMMARY

An embodiment of this disclosure provides a voice interaction based method and apparatus for generating a multimedia playlist.

In a first aspect, an embodiment of this disclosure provides a voice interaction based method for generating a multimedia playlist, including acquiring first voice request information for playing multimedia resources; identifying a key tag for indicating a characteristic attribute of the multimedia resources in the first voice request information; finding the multimedia resources having the key tag in a multimedia resource library; and generating a multimedia playlist based on the found multimedia resources.

In some embodiments, the generating a multimedia playlist based on the found multimedia resources includes: acquiring popularity data of the found multimedia resources, ordering the multimedia resources by the popularity data in a descending order; acquiring descriptor data of a user sending the first voice request information associated with to-be-played multimedia resources, selecting multimedia resources matching the user descriptor as candidate multimedia resources; and selecting a preset number of the candidate multimedia resources as target multimedia resources based on the order, and adding the target multimedia resources to the multimedia playlist.

In some embodiments, before the selecting a preset number of the candidate multimedia resources as target multimedia resources based on the order, and adding the target multimedia resources to the multimedia playlist, the generating a multimedia playlist based on the found multimedia resources further includes: determining weights of the key tags for indicating a given characteristic attribute based on occurrence numbers of the key tags in the multimedia resource library; and determining demand numbers of the multimedia resources having the key tags in the multimedia playlist based on the weights of the key tags and a preset length of the multimedia playlist. The selecting a preset number of the candidate multimedia resources as target multimedia resources based on the order, and adding the target multimedia resources to the multimedia playlist includes: dividing the candidate multimedia resources in groups based on the key tags; and extracting, based on the order, the multimedia resources satisfying the corresponding demand numbers from each of the groups, and generating the multimedia playlist based on the order of the candidate multimedia resources.

In some embodiments, the acquiring popularity data of the found multimedia resources includes: calculating the corresponding popularity data based on multimedia resource playing data and internet search data.

In some embodiments, the acquiring popularity data of the found multimedia resources further includes: judging whether the multimedia resources are multimedia resources being played in a preset period before the acquiring first voice request information for playing multimedia resources; and if yes, implementing attenuation operation on the popularity data of the multimedia resources by a preset attenuation factor.

In some embodiments, the identifying a key tag for indicating a characteristic attribute of the multimedia resources in the first voice request information includes: extracting a tag matching a preset tag library in the first voice request information as the key tag.

In some embodiments, the characteristic attribute includes: an author, an identifier for a set of the multimedia resources, a style or a language.

In some embodiments, after the generating a multimedia playlist based on the found multimedia resources, the method further includes: responding to received second voice request information for playing multimedia resources; analyzing an intention of the second voice request information, and updating the multimedia playlist based on a result of the analyzing an intention.

In some embodiments, the method further includes: pushing the multimedia playlist to a device sending the first voice request information.

In a second aspect, an embodiment of this disclosure provides a voice interaction based apparatus for generating a multimedia playlist, including: an acquisition unit, for acquiring first voice request information for playing multimedia resources; an identification unit, for identifying a key tag for indicating a characteristic attribute of the multimedia resources in the first voice request information; a search unit, for finding the multimedia resources having the key tag in a multimedia resource library; and a generation unit, for generating a multimedia playlist based on the found multimedia resources.

In some embodiments, the generation unit is further used for generating a multimedia playlist as follows: acquiring popularity data of the found multimedia resources, ordering the multimedia resources by the popularity data in a descending order; acquiring descriptor data of a user sending the first voice request information associated with to-be-played multimedia resources, selecting multimedia resources matching the user descriptor as candidate multimedia resources; and selecting a preset number of the candidate multimedia resources as target multimedia resources based on the order, and adding the target multimedia resources to the multimedia playlist.

In some embodiments, the generation unit is further used for: before the selecting a preset number of the candidate multimedia resources as target multimedia resources based on the order, and adding the target multimedia resources to the multimedia playlist, determining weights of the key tags for indicating a given characteristic attribute based on occurrence numbers of the key tags in the multimedia resource library; and determining demand numbers of the multimedia resources having the key tags in the multimedia playlist based on the weights of the key tags and a preset length of the multimedia playlist. The generation unit is further used for generating the multimedia playlist as follows: dividing the candidate multimedia resources in groups based on the key tags; extracting, based on the order, the multimedia resources satisfying the corresponding demand numbers from each of the groups, and generating the multimedia playlist based on the order of the candidate multimedia resources.

In some embodiments, the generation unit is further used for acquiring popularity data of the found multimedia resources as follows: calculating the corresponding popularity data based on multimedia resource playing data and internet search data.

In some embodiments, the generation unit is further used for acquiring popularity data of the found multimedia resources as follows: judging whether the multimedia resources are multimedia resources being played in a preset period before the acquiring first voice request information for playing multimedia resources; and if yes, implementing attenuation operation on the popularity data of the multimedia resources by a preset attenuation factor.

In some embodiments, the identification unit is further used for identifying a key tag for indicating a characteristic attribute of the multimedia resources in the first voice request information as follows: extracting a tag matching a preset tag library in the first voice request information as the key tag.

In some embodiments, the characteristic attribute includes: an author, an identifier for a set of the multimedia resources, a style or a language.

In some embodiments, the apparatus further includes an update unit for: responding to received second voice request information for playing multimedia resources; analyzing an intention of the second voice request information, and updating the multimedia playlist based on a result of the analyzing an intention.

In some embodiments, the apparatus further includes: a push unit, for pushing the multimedia playlist to a device sending the first voice request information.

The voice interaction based method and apparatus for generating a multimedia playlist according to the embodiments of this disclosure acquire first voice request information for playing multimedia resources, identify a key tag for indicating a characteristic attribute of the multimedia resources in the first voice request information, then find the multimedia resources having the key tag in a multimedia resource library, and finally generate a multimedia playlist based on the found multimedia resources, thereby eliminating a user editing operation in the multimedia playlist, realizing automatic generation of the multimedia playlist, and improving the efficiency of voice service.

BRIEF DESCRIPTION OF THE DRAWINGS

By reading and referring to the detailed description of non-limiting embodiments provided in the accompanying drawings, other features, objects and advantages of the disclosure will become clearer.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
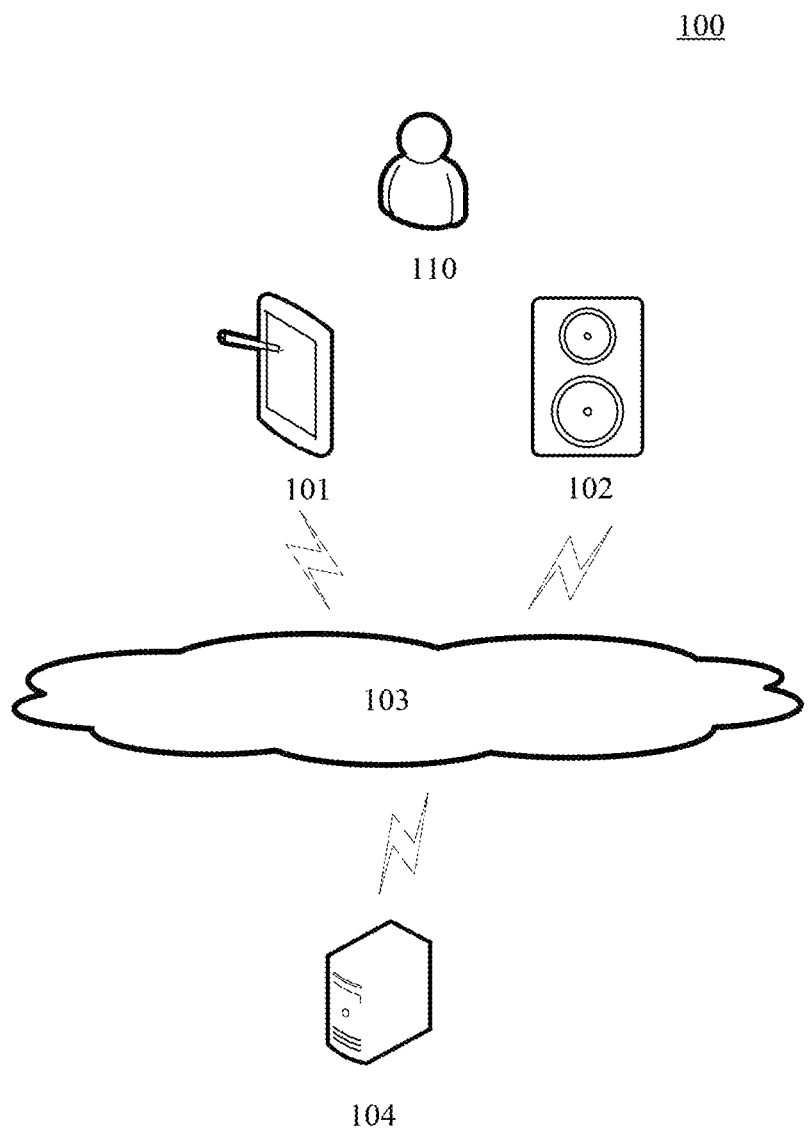
FIG. 1 is an illustrative system structure diagram where the disclosure may be applied.

FIG. 1 shows an illustrative architecture of a system 100 which may be used by a method for providing voice service or an apparatus for providing voice service according to the embodiments of the present application.

As shown in FIG. 1, the system architecture 100 may include terminal devices 101, and 102, a network 103 and a server 104. The network 103 serves as a medium providing a communication link between the terminal devices 101, and 102 and the server 104. The network 103 may include various types of connections, such as wired or wireless transmission links, or optical fibers.

A user 110 may use the terminal devices 101 and 102 to interact with the server 104 through the network 103 to receive or send messages, etc. The terminal devices 101, 102 may be electronic devices that have an audio input interface and an audio output interface, and support network communication, such as loudspeaker boxes having microphones, smart phones, tablet PCs, notebook computers, smart wearable devices. The terminal devices 101 and 102 may be installed with applications for interacting with the server 104, such as voice service clients.

The server 104 may be a server that provides a variety of services, such as a voice server that controls a voice output operation executed by the terminal devices 101 and 102.

After the terminal devices 101 and 102 are connected to a voice server (for example, getting permission), the voice server may process a voice service request sent by the user 110 through the terminal devices 101 and 102, and send the process result (such as audio data and control instructions of the audio output interface) to the terminal devices 101 and 102. The terminal devices 101 and 102 may receive audio data and control instructions sent by the server 104 through the network 103, and execute corresponding operations, thereby realizing completion of voice service using the terminal devices 101 and 102.

It should be noted that the voice interaction based method for generating a multimedia playlist provided in embodiments of this disclosure is generally executed by the server 104, and correspondingly, the voice interaction based apparatus for generating a multimedia playlist is generally installed on the server 104.

It should be understood that the numbers of terminals, devices, networks and servers in FIG. 1 are only illustrative. Depending on the actual needs, any numbers of terminal devices, networks and servers may be provided. For example, the server may be clustered servers, including a plurality of servers that deploy different processes.

Figure 2:
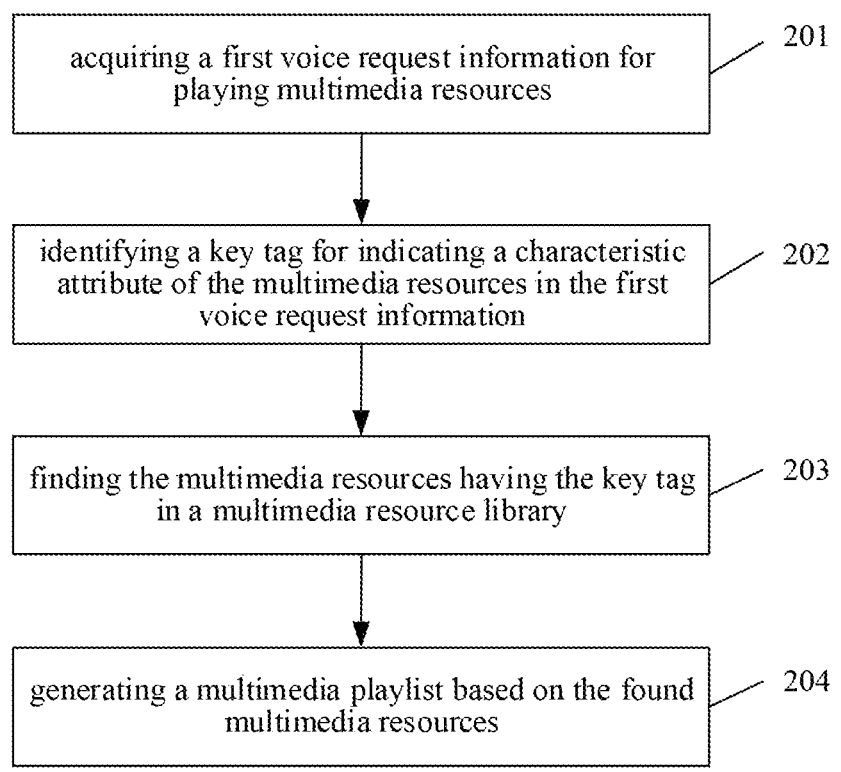
FIG. 2 is a flow diagram of an embodiment of a voice interaction based method for generating a multimedia playlist according to the disclosure.

Further referring to FIG. 2, a process 200 of an embodiment of a voice interaction based method for generating a multimedia playlist according to this disclosure is shown. The voice interaction based method for generating a multimedia playlist includes the following steps:

Step 201, acquiring first voice request information for playing multimedia resources.

In this embodiment, an electronic device (e.g., the server shown in FIG. 1) on which a voice interaction based method for generating a multimedia playlist runs may acquire first voice request information for playing multimedia resources sent by a device accessed to voice service. The first voice request information may be sent by a user using the device accessed to voice service, and be transferred by the device accessed to voice service to the electronic device on which the voice interaction based method for generating a multimedia playlist runs. The device accessed to voice service may be an intelligent voice device, and the electronic device on which the voice interaction based method for generating a multimedia playlist runs may be an electronic device providing voice service for the intelligent voice device.

The device accessed to voice service may detect in real time whether a user sends a voice request, for example, whether there is an audio signal input, and may acquire, when it is detected that a user sends a voice request, the contents of the voice request through an audio input interface. Then the device accessed to voice service may implement format conversion, encapsulation, and other operations on the voice request, generate first voice request information including the contents of a user request, and send the request to the electronic device providing voice service.

In some optional modes of implementing this embodiment, the device accessed to voice service may receive a voice request sent by a user in response to a wake-up request from the user. Here, the wake-up request may be a preset wake-up keyword or wake-up operation. For example, the wake-up keyword may be a name of a virtual character, and the wake-up operation may be a press on a specific button. After being woken up, the device may acquire audio data of the voice request sent by the user, and then transfer the audio data to an electronic device providing voice service.

The first voice request information for playing multimedia resources may be voice information requesting for playing specific multimedia resources. Here, the multimedia resources may include, but not limited to: audios, videos and pictures. Correspondingly, the first voice request information for playing multimedia resources may be first voice request information that requests for playing songs or music, video files and picture files. In a practical scenario, a user may send a voice request for "playing popular songs" to an intelligent voice device, the to-be-played multimedia resources requested by the voice request are music, and the specific type of music is "popular songs". A voice request for "playing the latest fashion videos" may be sent to an intelligent voice device having a screen, the to-be-played multimedia resources requested by the voice request are videos, and the specific type of videos is "the latest fashion videos".

Step 202, identifying a key tag for indicating a characteristic attribute of the multimedia resources in the first voice request information.

In this embodiment, the electronic device on which the voice interaction based method for generating a multimedia playlist runs may analyze the acquired first voice request to obtain a corresponding text, lex the text, and determine whether the result of the lexing includes a tag for indicating a characteristic attribute of the multimedia resources. For example, a word indicating a time, an emotion, a name and the like in the result of the lexing may be identified as an extracted key tag.

In some embodiments, a tag matching a preset tag library in the first voice request information may be extracted as a key tag. Specifically, after the text conversion and the lexing of the first voice request information, whether the result of the lexing includes a tag in the preset tag library is identified. The preset tag library may include tags for indicating a characteristic attribute of multimedia resources in a network, wherein the characteristic attribute may be a characteristic distinguishing the multimedia resources from other multimedia resources, such as an identifier, a content feature and the like of multimedia resources.

Optionally, the characteristic attribute may include, but are not limited to: an author, an identifier for a set of the multimedia resources, a style or a language. The author may be an author of the multimedia resources, including a singer, a lyricist, a composer, an arranger, a photographer, a scriptwriter, etc. The identifier for a set of multimedia resources may be identifier for a set of the multimedia resources that contains the multimedia resources, such as an album or a special subject to which a song belongs. The style may be the type of the multimedia resources, for example, a song may be a rock and roll, a popular song, a folk song, a rap, etc. The language represents an audio language of the multimedia resources, such as cantonese, mandarin Chinese, English.

In general, multimedia resources in a network have the characteristic attributes, and are labeled with tags for indicating the characteristic attributes. For example, a song Nunchakus has tags "Jay Chou," "Fantasy," "popular," "mandarin Chinese," etc., and "Jay Chou," "Fantasy," "popular," and "mandarin Chinese" are the tags for indicating the author, the identifier for a set of the multimedia resource, the style, and the language of the song, respectively.

The preset tag set may include all tags of multimedia resources in a network. In this embodiment, tags contained in the first voice request information may be identified based on the preset tag set as key tags of the requested multimedia resources in the first voice request information. Specifically, words acquired by lexing may be used to match the preset key tag set, and the words successfully matching the preset key tag set are the identified key tags. Optionally, the matching may be implemented by fuzzy matching, and may also be implemented by synonym matching. For example, "relief" may match "mitigation".

Step 203, finding the multimedia resources having the key tag in a multimedia resource library.

After a key tag in the first voice request information is identified, a plurality of multimedia resources having the key tag may be found in a multimedia resource library. Here, the identified key tag may indicate a user demand for a characteristic attribute of multimedia resources, and then multimedia resources satisfying the demand may be found in the multimedia resource library as candidate multimedia resources.

In some optional modes of implementing this embodiment, a plurality of key tags may be identified in the step 202. For example, in a user's voice request "I'd like to listen to Jay Chou's album Ye Hui Mei and JJ Lam's album Jiang Nan," identified key tags include "Jay Chou," "Ye Hui Mei," "JJ Lam," and "Jiang Nan," then a logical relation between these key tags may be further analyzed based on the lexeme of the voice request, and multimedia resources are searched based on the constraints of the logical relation. For example, a logical relation "AND" between the key tags "Jay Chou" and "Ye Hui Mei" is concluded from "Jay Chou's album Ye Hui Mei," and then multimedia resources having both tags "Jay Chou" and "Ye Hui Mei" may be found when searching multimedia resources. For another example, a logical relation "OR" between the key tags "Jay Chou" and "JJ Lam" is concluded from the term "and" in "Jay Chou's album Ye Hui Mei and JJ Lam's album Jiang Nan," and then multimedia resources having both tags "Jay Chou" and "Ye Hui Mei," and multimedia resources having both tags "JJ Lam" and "Jiang Nan" may be found when searching multimedia resources.

Step 204, generating a multimedia playlist based on the found multimedia resources.

In this embodiment, a plurality of multimedia resources matching the received first voice request for playing multimedia resources may be found in the step 203. A playlist may be formed by the plurality of the found multimedia resources, and the play sequence of the multimedia resources in the playlist may be determined by the search sequence.

In some optional modes of implementing this embodiment, a preset number of multimedia resources may be selected from the plurality of the found multimedia resources to generate a multimedia playlist. For example, in a scenario of playing music, a total of 50 songs in a playlist may be set, and when more than 50 songs are found in the step 203, 50 songs may be selected randomly or according to a predetermined strategy therefrom to generate a song playlist. Thus, it is possible to guarantee to satisfy a user demand for enjoying multimedia resources in an enough long time after sending a first voice request, and prevent played multimedia resources from lack of diversity due to an overlong playlist.

The voice interaction based method for generating a multimedia playlist according to the embodiments of this disclosure acquires first voice request information for playing multimedia resources, identifies a key tag for indicating a characteristic attribute of the multimedia resources in the first voice request information, then finds the multimedia resources having the key tag in a multimedia resource library, and finally generates a multimedia playlist based on the found multimedia resources, thereby eliminating a user editing operation in the multimedia playlist, realizing automatic generation of the multimedia playlist, and improving the efficiency of voice service.

Figure 3:
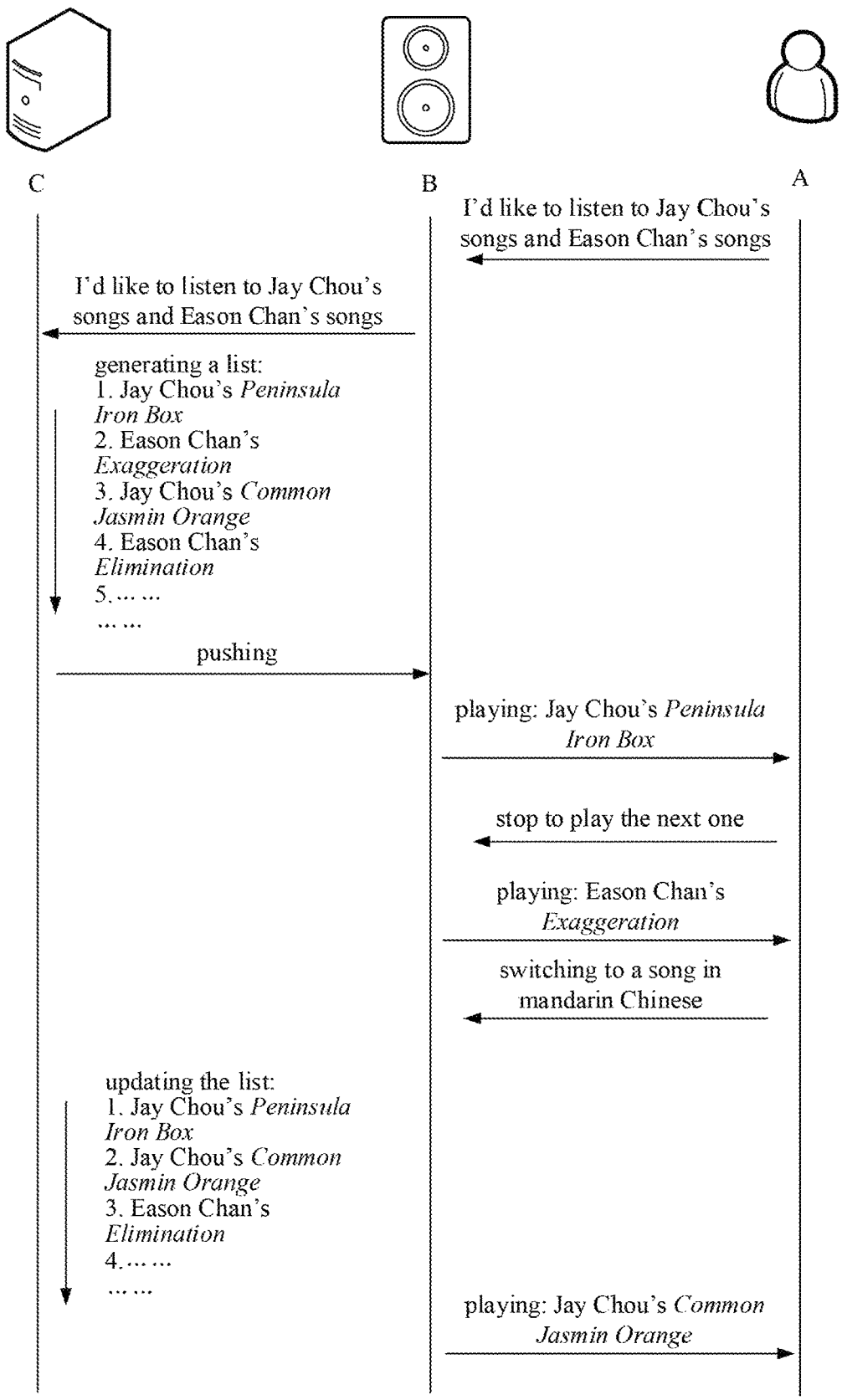
FIG. 3 is a schematic diagram of interaction of an application scenario of a voice interaction based method for generating a multimedia playlist according to the disclosure.

Referring to FIG. 3, a schematic diagram of interaction of an application scenario of a voice interaction based method for generating a multimedia playlist according to the disclosure is shown.

As shown in FIG. 3, a user A sends a voice interaction request "I'd like to listen to the songs of Jay Chou and Eason Chan" to an intelligent voice device B, which may transfer the request to a voice server C. After acquiring the request, the voice device C may identify key tags "Jay Chou" and "Eason Chan" therein, find some songs of Jay Chou and Eason Chan, acquire song resources, and combine the song resources to generate a song list. The intelligent voice device B may receive the song resources pushed by the voice server C, and successively play the songs per the song list. For example, a first song, i.e., Jay Chou's Peninsula Iron Box, in the song list may be played firstly, and upon receipt of a user request "next," the next song, i.e., Eason Chan's Exaggeration, in the song list will be switched to.

In some embodiments, after the generating a multimedia playlist based on the found multimedia resources, the voice interaction based method for generating a multimedia playlist may further include: responding to received second voice request information for playing multimedia resources; analyzing an intention of the second voice request information, and updating the multimedia playlist based on a result of the analyzing an intention. Specifically, information related to user feedback and information related to a multimedia resource selection instruction in the second voice request information may be extracted, a user intention is determined based on the extracted information, and then the playlist is adjusted correspondingly according to the user intention. For example, when the second voice request information sent by a user is "switching to another," it may be identified that the user intention is to stop playing the current multimedia resources, and playing other multimedia resources, and then the currently played multimedia resource is deleted from the multimedia playlist.

In a practical scenario, a user may implement more than one round of voice interactions with an intelligent voice device to customize a multimedia playlist complying with his/her own preference. If the user is not interested in the currently played multimedia resources, he/she may send an instruction for switching the multimedia resources, and may send a request for acquiring more relevant resources if he/she would like to increase to-be-acquired multimedia resources. Under the circumstance, the electronic device on which the voice interaction based method for generating a multimedia playlist runs may implement an intention analysis of the instruction or request sent by the user, and change the playlist based on the intention analysis, thereby adjusting the multimedia playlist to be closer to the user's preference and demand.

Further referring to FIG. 3, in the illustrative scenario, if the intelligent voice device B is currently playing a second song, i.e., Eason Chan's Exaggeration, in the playlist, and the user A sends a second voice request "switching to a song in mandarin Chinese," the voice server C may delete all songs in other languages except mandarin Chinese in the playlist, generate a new playlist, and push the next song, i.e., Jay Chou's Common Jasmin Orange, per the sequence in the playlist to the intelligent voice device B, so that the intelligent voice device B plays Jay Chou's Common Jasmin Orange.

In some embodiments, the voice interaction based method for generating a multimedia playlist may further include pushing the multimedia playlist to a device sending the first voice request information. The electronic device on which the voice interaction based method for generating a multimedia playlist runs may push the generated multimedia playlist to the intelligent voice device sending the first voice request. The intelligent voice device may store the multimedia playlist locally. Optionally, the multimedia resources in the playlist may also be pushed to the intelligent voice device, so that the intelligent voice device stores correspondingly the playlist and the corresponding multimedia resources, and plays them.

In some embodiments, in the step 204 of generating a multimedia playlist based on the found multimedia resources, the multimedia resources may be selected based on popularities of the multimedia resources, user preference, etc. Specifically, referring to FIG. 4, a flow diagram of an embodiment of a method for generating a multimedia playlist based on found multimedia resources according to the disclosure is shown.

Figure 4:
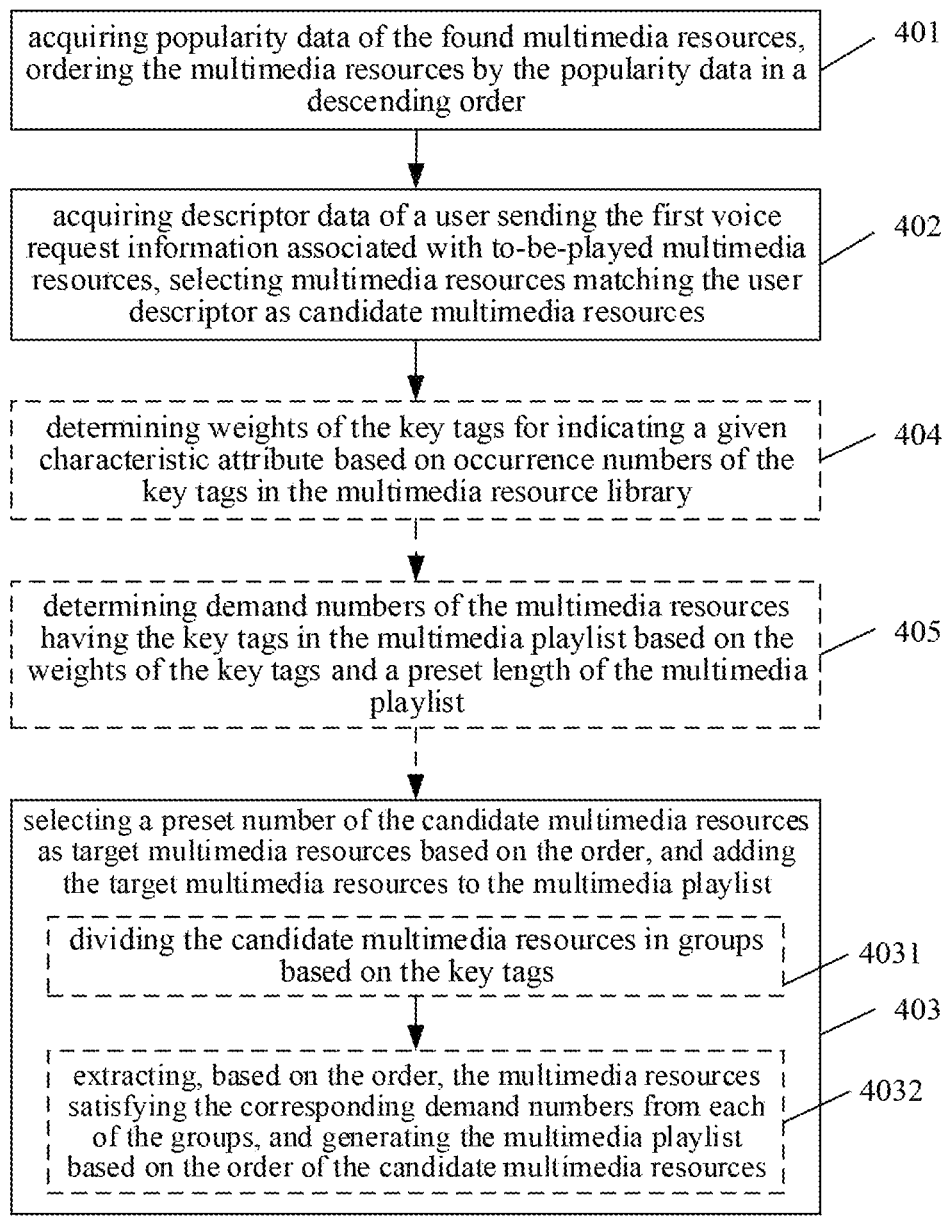
FIG. 4 is a flow diagram of an embodiment of a method for generating a multimedia playlist based on found multimedia resources according to the disclosure.

As shown in FIG. 4, a process 400 of a method for generating a multimedia playlist based on the found multimedia resources according to the embodiment includes the following steps:

Step 401, acquiring popularity data of the found multimedia resources, and ordering the multimedia resources by the popularity data in a descending order.

In this embodiment, popularity data of the found multimedia resources having key tags in a multimedia resource library may be acquired, where the popularity data may indicate utilization rate and attention data of the multimedia resources. The popularity data may be calculated based on clicks on the internet, creation time of the multimedia resources, etc. For example, the higher the clicks are, and the closer the creation time is to the current time, the greater the popularity of multimedia resources is.

In some optional modes of implementing this embodiment, corresponding popularity data may be calculated based on playing data and internet search data of the multimedia resources. It is possible to collect playing data, such as the number of playing times, playing duration and the number of users performing on-demand playing operation, of multimedia resources in a previous period as of the current time, and search frequencies of multimedia resources on digital music platforms, and calculate popularity data based on the collected data, e.g., by weighted sum of the collected data, or by weighted sum of the collected data after time decay of the data according to the generation time thereof.

In a further mode of implementing this embodiment, whether the multimedia resources are multimedia resources being played in a preset period before acquiring first voice request information for playing the multimedia resources may be further judged, and if yes, attenuation operation on popularity data of the multimedia resources is implemented by a preset attenuation factor. Here, the preset period before acquiring the first voice request information for playing the multimedia resources may be a period of time before the current time, e.g., the last three days. Attenuation filtering of the popularity data of the multimedia resources being played in this period may be implemented. For example, a time decay factor may be set as $\alpha$, and attenuation operation may be implemented based on a time length t from the playing time of multimedia resources to the current time point, i.e., the attenuation operation means to multiply popularity data by $\alpha^t$, where $0<\alpha<1$. Thus, the popularity of the multimedia resources being played recently may be reduced to screen out fresh resources for a user when subsequently screening multimedia resources by popularity.

After acquiring popularity data of the found multimedia resources, the multimedia resources may be ordered by the popularity data in a descending order to select multimedia resources by the popularity data in a descending order when subsequently generating a playlist.

Step 402, acquiring descriptor data of a user sending the first voice request information associated with to-be-played multimedia resources, and selecting multimedia resources matching the user descriptor as candidate multimedia resources.

The electronic device on which the voice interaction based method for generating a multimedia playlist runs may further acquire descriptor data of a user sending the first voice request information associated with to-be-played multimedia resources, including user's essential attributes and user's playing behaviour, preference, feedback, etc. in the interaction with an intelligent voice device. The user's essential attributes therein may include user's age, gender, traits, etc. The playing behaviour may, e.g., include behaviour of adding to favorites, the number of playing times, playing duration, behaviour of switching to-be-played multimedia resources, etc. The preference may include user preferred types of multimedia resources acquired based on user's behaviours, such as adding to favorites, thumbing up. The feedback data may include positive feedback or negative feedback sent by a user via voice or in other ways. Through analysis of the data, user's preference for attributive features of multimedia resources may be acquired.

According to user descriptor data, the found multimedia resources having key tags may be screened, and multimedia resources matching the user descriptor are selected therefrom as candidate multimedia resources. Thus, multimedia resources in which a user may be interested may be screened out from the found multimedia resources as candidate multimedia resources to generate a multimedia playlist, thereby realizing further precise screening of multimedia resources.

Step 403, selecting a preset number of the candidate multimedia resources as target multimedia resources based on the order, and adding the target multimedia resources to the multimedia playlist.

After selecting the candidate multimedia resources, multimedia resources may be successively selected by popularity in descending order as target multimedia resources, and added to the multimedia playlist. When the number of multimedia resources in the multimedia playlist reaches a preset number, a multimedia playlist is generated. Multimedia resources with the first to the N-th (N is a preset number) popularity in the order may also be directly extracted as target multimedia resources to generate a multimedia playlist.

It should be noted that a multimedia playlist is a list containing identifier information (such as song name and singer name) of multimedia resources, and the sequence of multimedia resources in the list is the playing sequence. In this embodiment, multimedia resources matching a user descriptor are screened through ordering by popularity data, so that the generated multimedia playlist may more accurately match with user demand.

In some optional modes of implementing this embodiment, before selecting a preset number of candidate multimedia resources as target multimedia resources based on the order, and adding the target multimedia resources to the multimedia playlist, a process 400 of the generating a multimedia playlist based on the found multimedia resources may further include:

Step 404, determining weights of the key tags for indicating a given characteristic attribute based on occurrence numbers of the key tags in the multimedia resource library.

The key tags are extracted based on analysis of the first voice request information, and indicate a characteristic attribute of multimedia resources to be acquired by a user. In some scenarios, a plurality of key tags for indicating a given characteristic attribute may be identified in the first voice request information. Under the circumstance, the number of multimedia resources having the key tags in the multimedia resource library may be collected, and then a weight of each key tag is acquired by dividing the number of multimedia resources having the each key tag by the number of multimedia resources having key tags that indicating a given characteristic attribute as the each key tag.

Here, the occurrence number of the each key tag in the multimedia resource library and the total occurrence number of the key tags that indicating a given characteristic attribute as the each key tag may be collected. In this embodiment, a plurality of key tags for indicating a given characteristic attribute of multimedia resources may be identified in the first voice request information, and the occurrence numbers of the key tags in the multimedia resource library are different. The occurrence number of each key tag in the multimedia resource library may be the number of multimedia resources that contain the each key tag.

For example, if the first voice request information for playing multimedia resources is "I'd like to listen to songs of Jay Chou, Eason Chan and Shu Pu," key tags therein include "Jay Chou," "Eason Chan" and "Shu Pu". If 100 Jay Chou's songs, 130 Eason Chan' songs and 20 Shu Pu's songs that are collected are found in a song library, then the weight of the key tag "Jay Chou" is $\mu1=100/(100+130+20)=0.4$, the weight of "Eason Chan" is $\mu2=130/(100+130+20)=0.52$, and the weight of "Shu Pu" is $\mu3=20/(100+130+20)=0.08$.

Step 405, determining demand numbers of the multimedia resources having the key tags in the multimedia playlist based on the weights of the key tags and a preset length of the multimedia playlist.

Then, the numbers of the multimedia resources having the key tags may be distributed based on the weights of the key tags, and the preset length of the multimedia playlist, so that the numbers of the multimedia resources having the key tags in the multimedia playlist are proportional to the weights thereof.

Under the premise of determining demand numbers of the multimedia resources having the key tags based on the weights of the key tags, the step 403 of the selecting a preset number of the candidate multimedia resources as target multimedia resources based on the order, and adding the target multimedia resources to the multimedia playlist may include:

Step 4031, dividing the candidate multimedia resources in groups based on the key tags.

Firstly, all of the candidate multimedia resources may be grouped based on the key tags, i.e., the candidate multimedia resources having a given key tag may be divided into a given group. For example, in the above examples, all songs of the singer "Jay Chou" are divided into a first group, all songs of the singer "Eason Chan" are divided into a second group, and all songs of the singer "Shu Pu" are divided into a third group.

Step 4032, extracting, based on the order, the multimedia resources satisfying the corresponding demand numbers from each of the groups, and generating the multimedia playlist based on the order of the candidate multimedia resources.

The demand number of the corresponding multimedia resources in each group may be selected based on the order. Thus, in the multimedia playlist, the numbers of the multimedia resources corresponding to the key tags are proportional to the weights thereof. After the selecting the demand number of the corresponding multimedia resources in each group, the multimedia playlist may be generated by randomly ordering all of the selected multimedia resources.

The number of multimedia resources corresponding to each key tag is determined by the occurrence number of the key tag in a multimedia resource library and the total occurrence number of the key tags for indicating a given characteristic attribute in the multimedia resource library, which may guarantee the generated playlist to cover all the key tags in the first voice request information, and avoid failing to completely cover to-be-played multimedia resources requested by a user because of neglecting some tags having low popularities in the ordering process.

In the above example where the first voice request information for playing multimedia resources is "I'd like to listen to songs of Jay Chou, Eason Chan and Shu Pu," if a preset length of a multimedia playlist is 50, then a song list including 50 songs needs to be generated, and the song list may include $50\times\mu1=20$ songs of the singer Jay Chou, $50\times\mu2=26$ songs of the singer Eason Chan and $50\times\mu3=4$ songs of the singer Shu Pu. Then the first 20 songs in popularity ranking of Jay Chou's songs, the first 26 songs in popularity ranking of Eason Chan's songs and the first 4 songs in popularity ranking of Shu Pu's songs may be selected from screened songs matching a user descriptor to form a song list, thus guaranteeing the song list to cover all favourite singers of the user, comprehensively considering popularity data, and improving the matching rate between the song list and the user intention.

Figure 5:
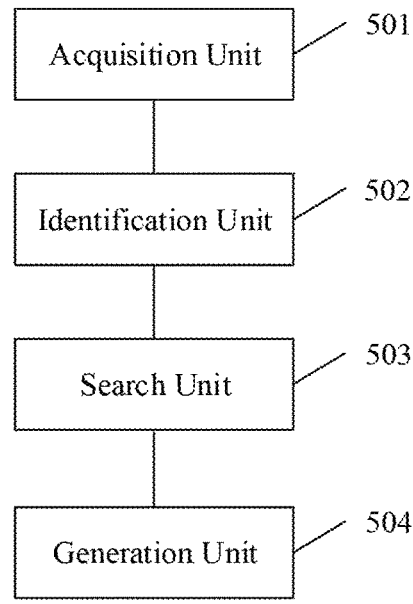
FIG. 5 is a structural diagram of a voice interaction based apparatus for generating a multimedia playlist according to embodiments of the disclosure.

Further referring to FIG. 5, as implementation of the methods shown in the figures, the disclosure provides an embodiment of a voice interaction based apparatus for generating a multimedia playlist, the embodiment of the apparatus corresponds to the embodiments of the methods shown in FIG. 2 and in FIG. 4, and the apparatus may be specifically applied in a variety of electronic devices.

As shown in FIG. 5, a voice interaction based apparatus 500 for generating a multimedia playlist according to this embodiment includes: an acquisition unit 501, an identification unit 502, a search unit 503 and a generation unit 504, where the acquisition unit 501 is used for acquiring first voice request information for playing multimedia resources; the identification unit 502 is used for identifying a key tag for indicating a characteristic attribute of the multimedia resources in the first voice request information; and the search unit 503 is used for finding the multimedia resources having the key tag in the multimedia resource library; and the generation unit 504 is used for generating a multimedia playlist based on the found multimedia resources.

In this embodiment, the acquisition unit 501 may acquire the first voice request information sent by a device accessed to voice service to request for playing multimedia resources, where the multimedia resources may be digital multimedia resources, including audios, videos, pictures, etc. Specifically, a user who uses a device accessed to voice service for voice interaction may send a voice request for playing multimedia resources; the device accessed to voice service receives the request, implements data analysis, coding and encapsulation, and then generates a first voice request information; and the acquisition unit 501 may acquire the first voice request information through wired connection or wireless connection.

The identification unit 502 may analyze the first voice request acquired by the acquisition unit 501 to acquire a corresponding text, lex the text, and judge whether the result of the lexing contains a tag for indicating a characteristic attribute of the multimedia resources. The characteristic attribute of the multimedia resources therein may be distinguishing features of the multimedia resources from other multimedia resources, such as identifiers, content properties and the like of the multimedia resources. When judging whether the result of the lexing contains a tag for indicating a characteristic attribute of the multimedia resources, words acquired by lexing may match a preset tag library, and successively matched tags are identified key tags.

The search unit 503 may search multimedia resources having the key tags identified by the identification unit 502 in the multimedia resource library. Here, each multimedia resource in the multimedia resource library generally has at least one tag for indicating a characteristic attribute of the each multimedia resource, tags of multimedia resources in the multimedia resource library may accurately match and/or fuzzily match the key tags identified by the identification unit 502, and whether the multimedia resources are added to the playlist is determined by the matching results.

The generation unit 504 may combine a plurality of found multimedia resources to form a playlist, and the playing sequence of multimedia resources in the playlist may be determined by the search sequence. Optionally, the length of a multimedia playlist (i.e., the number of contained multimedia resources) may be preset, and then the preset number of multimedia resources found by the search unit 503 may be selected to generate the multimedia playlist.

In some embodiments, the generation unit 504 may be further used for generating a multimedia playlist as follows: acquiring popularity data of the found multimedia resources, ordering the multimedia resources by the popularity data in a descending order; acquiring descriptor data of a user sending the first voice request information associated with to-be-played multimedia resources, selecting multimedia resources matching the user descriptor as candidate multimedia resources; selecting a preset number of the candidate multimedia resources as target multimedia resources based on the order, and adding the target multimedia resources to the multimedia playlist.

In some embodiments, the generation unit 504 may be further used for: determining weights of the key tags for indicating a given characteristic attribute based on occurrence numbers of the key tags in the multimedia resource library before selecting a preset number of the candidate multimedia resources as target multimedia resources based on the order, and adding the target multimedia resources to the multimedia playlist; and determining demand numbers of the multimedia resources having the key tags in the multimedia playlist based on the weights of the key tags and a preset length of the multimedia playlist. Under the circumstance, the generation unit 504 may be further used for generating the multimedia playlist as follows: dividing the candidate multimedia resources in groups based on the key tags; extracting, based on the order, the multimedia resources satisfying the corresponding demand numbers from each of the groups, and generating the multimedia playlist based on the order of the candidate multimedia resources.

In some embodiments, the generation unit 504 may be further used for acquiring popularity data of the found multimedia resources as follows: calculating the corresponding popularity data based on multimedia resource playing data and internet search data.

In some embodiments, the generation unit 504 may be further used for acquiring popularity data of the found multimedia resources as follows: judging whether the multimedia resources are multimedia resources being played in a preset period before the acquiring first voice request information for playing multimedia resources; and if yes, implementing attenuation operation on the popularity data of the multimedia resources by a preset attenuation factor.

In some embodiments, the identification unit 502 may be further used for identifying a key tag for indicating a characteristic attribute of the multimedia resources in the first voice request information as follows: extracting a tag matching a preset tag library in the first voice request information as the key tag.

In some embodiments, the characteristic attribute may include: an author, an identifier for a set of the multimedia resources, a style or a language.

In some embodiments, the apparatus 500 may further include an update unit for: responding to received second voice request information for playing multimedia resources; analyzing an intention of the second voice request information, and updating the multimedia playlist based on a result of the analyzing an intention.

In some embodiments, the apparatus 500 may further include: a push unit, for pushing the multimedia playlist to a device sending the first voice request information.

It should be understood that the units recorded in the apparatus 500 correspond to the steps in the methods described in FIG. 2 and FIG. 4. Thus, the foregoing operations and features described for the methods are also applicable to the apparatus 500 and units included therein, and are not repeated any more here.

The voice interaction based apparatus 500 for generating a multimedia playlist according to the embodiments of this disclosure identifies, by acquiring first voice request information for playing multimedia resources, a key tag for indicating a characteristic attribute of the multimedia resources in the first voice request information, then finds the multimedia resources having the key tag in a multimedia resource library, and finally generates a multimedia playlist based on the found multimedia resources, thereby eliminating a user editing operation in the multimedia playlist, realizing automatic generation of the multimedia playlist, and improving the efficiency of voice service.

Below referring to FIG. 6, a structural diagram of a computer system 600 of a server applicable for implementing embodiments of the disclosure is shown. The server shown in FIG. 6 is only an example, and shall not limit the functions and serviceable range of embodiments of the disclosure in any way.

Figure 6:
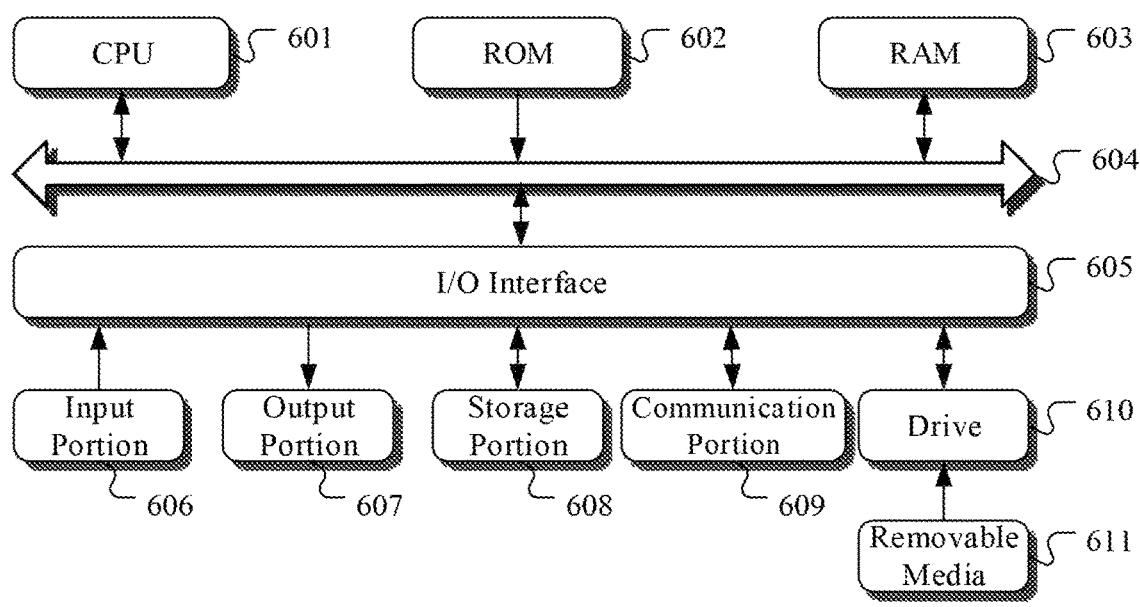
FIG. 6 is a structural diagram of a computer system of a server applicable for implementing embodiments of the disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A drive 610 is also connected to the I/O interface 605 as required. A removable medium 611, such as a magnetic disk, an optical disk, a magneto-optical disk, and a semiconductor memory, may be installed on the drive 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure. It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising an acquisition unit, an identification unit, a search unit, and a generation unit, where the names of these units or modules do not in some cases constitute a limitation to such units or modules themselves. For example, the acquisition unit may also be described as "a unit for acquiring first voice request information for playing multimedia resources."

In another aspect, the present application further provides a computer-readable medium. The computer-readable medium may be the computer-readable medium included in the apparatus in the above described embodiments, or a stand-alone computer-readable medium not assembled into the apparatus. The computer-readable medium stores one or more programs. The one or more programs, when executed by a device, cause the device to: analyze, in response to receiving first voice request information sent by an intelligent voice device containing a display, the first voice request information to determine a user demand; determine an alternative operation associated with the user demand based on a configured optional operation set; generate prompt information for guiding a user to execute the alternative operation; and push the prompt information to the intelligent voice device containing the display to enable the intelligent voice device to show the prompt information on the display.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A voice interaction based method for generating a multimedia playlist, the method comprising:
   acquiring first voice request information for playing multimedia resources;
   identifying a key tag for indicating a characteristic attribute of the multimedia resources in the first voice request information;
   finding the multimedia resources having the key tag in a multimedia resource library; and
   generating a multimedia playlist based on the found multimedia resources;
   wherein the generating a multimedia playlist based on the found multimedia resources comprises:
   acquiring popularity data of the found multimedia resources, ordering the multimedia resources by the popularity data in a descending order;
   acquiring descriptor data of a user sending the first voice request information associated with to-be-played multimedia resources, selecting multimedia resources matching the user descriptor as candidate multimedia resources; and
   selecting a preset number of the candidate multimedia resources as target multimedia resources based on the order, and adding the target multimedia resources to the multimedia playlist; and
   wherein before the selecting a preset number of the candidate multimedia resources as target multimedia resources based on the order, and adding the target multimedia resources to the multimedia playlist, the generating a multimedia playlist based on the found multimedia resources further comprises:
   determining weights of the key tags for indicating a given characteristic attribute based on occurrence numbers of the key tags in the multimedia resource library; and
   determining demand numbers of the multimedia resources having the key tags in the multimedia playlist based on the weights of the key tags and a preset length of the multimedia playlist; and
   the selecting a preset number of the candidate multimedia resources as target multimedia resources based on the order, and adding the target multimedia resources to the multimedia playlist comprises:
   dividing the candidate multimedia resources in groups based on the key tags; and
   extracting, based on the order, the multimedia resources satisfying the corresponding demand numbers from each of the groups, and generating the multimedia playlist based on the order of the candidate multimedia resources.

2. The method according to claim 1, wherein the acquiring popularity data of the found multimedia resources comprises:
   calculating the corresponding popularity data based on multimedia resource playing data and internet search data.

3. The method according to claim 2, wherein the acquiring popularity data of the found multimedia resources further comprises:
   judging whether the multimedia resources are multimedia resources being played in a preset period before the acquiring first voice request information for playing multimedia resources; and
   implementing attenuation operation on the popularity data of the multimedia resources by a preset attenuation factor, in response to determine that the multimedia resources are multimedia resources being played in a preset period before the acquiring first voice request information for playing multimedia resources.

4. The method according to claim 1, wherein the identifying a key tag for indicating a characteristic attribute of the multimedia resources in the first voice request information comprises:
   extracting a tag matching a preset tag library in the first voice request information as the key tag.

5. The method according to claim 1, wherein the characteristic attribute comprises: an author, an identifier for a set of the multimedia resources, a style, or a language.

6. The method according to claim 1, wherein after the generating a multimedia playlist based on the found multimedia resources, the method further comprises:
   responding to received second voice request information for playing multimedia resources;
   analyzing an intention of the second voice request information, and updating the multimedia playlist based on a result of the analyzing an intention.

7. The method according to claim 1, the method further comprising:
   pushing the multimedia playlist to a device sending the first voice request information.

8. A voice interaction based apparatus for generating a multimedia playlist, the apparatus comprising:
   at least one processor; and
   a memory storing instructions, the instructions when executed by the at least one processor, cause the at least one processor to perform operations, the operations comprising:
   acquiring first voice request information for playing multimedia resources;
   identifying a key tag for indicating a characteristic attribute of the multimedia resources in the first voice request information;
   finding the multimedia resources having the key tag in a multimedia resource library; and
   generating a multimedia playlist based on the found multimedia resources;
   wherein the generating a multimedia playlist based on the found multimedia resources comprises:
   acquiring popularity data of the found multimedia resources, ordering the multimedia resources by the popularity data in a descending order:
   acquiring descriptor data of a user sending the first voice request information associated with to-be-played multimedia resources, selecting multimedia resources matching the user descriptor as candidate multimedia resources; and
   selecting a preset number of the candidate multimedia resources as target multimedia resources based on the order, and adding the target multimedia resources to the multimedia playlist; and
   wherein before the selecting a preset number of the candidate multimedia resources as target multimedia resources based on the order, and adding the target multimedia resources to the multimedia playlist, the generating a multimedia playlist based on the found multimedia resources further comprises:
   determining weights of the key tags for indicating a given characteristic attribute based on occurrence numbers of the key tags in the multimedia resource library; and
   determining demand numbers of the multimedia resources having the key tags in the multimedia playlist based on the weights of the key tags and a preset length of the multimedia playlist; and the selecting a preset number of the candidate multimedia resources as target multimedia resources based on the order, and adding the target multimedia resources to the multimedia playlist comprises:

dividing the candidate multimedia resources in groups based on the key tags; and extracting, based on the order, the multimedia resources satisfying the corresponding demand numbers from each of the groups, and generating the multimedia playlist based on the order of the candidate multimedia resources.

9. The apparatus according to claim 8, wherein the acquiring popularity data of the found multimedia resources comprises:

calculating the corresponding popularity data based on multimedia resource playing data and internet search data.

10. The apparatus according to claim 9, wherein the acquiring popularity data of the found multimedia resources further comprises:

judging whether the multimedia resources are multimedia resources being played in a preset period before the acquiring first voice request information for playing multimedia resources; and implementing attenuation operation on the popularity data of the multimedia resources by a preset attenuation factor, in response to determine that the multimedia resources are multimedia resources being played in a preset period before the acquiring first voice request information for playing multimedia resources.

11. The apparatus according to claim 8, wherein the identifying a key tag for indicating a characteristic attribute of the multimedia resources in the first voice request information comprises:

extracting a tag matching a preset tag library in the first voice request information as the key tag.

12. The apparatus according to claim 8, wherein the characteristic attribute comprises: an author, an identifier for a set of the multimedia resources, a style or a language.

13. The apparatus according to claim 8, wherein the operations further comprise:

responding to received second voice request information for playing multimedia resources;

analyzing an intention of the second voice request information, and updating the multimedia playlist based on a result of the analyzing an intention.

14. The apparatus according to claim 8, wherein the operations further comprise:

pushing the multimedia playlist to a device sending the first voice request information.

15. A non-transitory computer storage medium storing a computer program, the computer program when executed by one or more processors, causes the one or more processors to perform operations, the operations comprising:

acquiring first voice request information for playing multimedia resources;

identifying a key tag for indicating a characteristic attribute of the multimedia resources in the first voice request information;

finding the multimedia resources having the key tag in a multimedia resource library; and generating a multimedia playlist based on the found multimedia resources;

wherein the generating a multimedia playlist based on the found multimedia resources comprises:

acquiring popularity data of the found multimedia resources, ordering the multimedia resources by the popularity data in a descending order;

acquiring descriptor data of a user sending the first voice request information associated with to-be-played multimedia resources, selecting multimedia resources matching the user descriptor as candidate multimedia resources; and selecting a preset number of the candidate multimedia resources as target multimedia resources based on the order, and adding the target multimedia resources to the multimedia playlist; and wherein before the selecting a preset number of the candidate multimedia resources as target multimedia resources based on the order, and adding the target multimedia resources to the multimedia playlist, the generating a multimedia playlist based on the found multimedia resources further comprises:

determining weights of the key tags for indicating a given characteristic attribute based on occurrence numbers of the key tags in the multimedia resource library; and determining demand numbers of the multimedia resources having the key tags in the multimedia playlist based on the weights of the key tags and a preset length of the multimedia playlist; and the selecting a preset number of the candidate multimedia resources as target multimedia resources based on the order, and adding the target multimedia resources to the multimedia playlist comprises:

dividing the candidate multimedia resources in groups based on the key tags; and extracting, based on the order, the multimedia resources satisfying the corresponding demand numbers from each of the groups, and generating the multimedia playlist based on the order of the candidate multimedia resources.

* * * * *